United States Patent [19]

Darr

[11] Patent Number: 4,535,754

[45] Date of Patent: Aug. 20, 1985

[54] MANUFACTURED FUEL ASSISTED SOLAR HEAT EXCHANGER

[75] Inventor: Harry W. Darr, Kirkland, Wash.

[73] Assignee: D&M Investments, Yakima, Wash.

[21] Appl. No.: 466,071

[22] Filed: Feb. 14, 1983

Related U.S. Application Data

[63] Continuation-in-part of Ser. No. 236,691, Feb. 23, 1981, abandoned.

[51] Int. Cl.³ ................................................. F24J 3/02
[52] U.S. Cl. ..................................... 126/419; 126/427; 126/438; 126/439; 126/443; 62/235.1
[58] Field of Search ............... 126/427, 437, 438, 443, 126/419, 422, 439; 62/235.1, 238.3

[56] References Cited

U.S. PATENT DOCUMENTS

| | | | |
|---|---|---|---|
| 2,213,894 | 9/1940 | Barry | 126/419 |
| 2,594,063 | 4/1952 | Norman | 126/360 A |
| 3,998,205 | 12/1976 | Scragg et al. | 126/427 |
| 4,007,776 | 2/1977 | Alkasab | 126/437 |
| 4,086,911 | 5/1978 | Futch | 126/443 |
| 4,100,756 | 7/1978 | Albertson | 62/235.1 |
| 4,222,244 | 9/1980 | Meckler | 62/235.1 |
| 4,256,090 | 3/1981 | Imperiale | 126/427 |
| 4,328,791 | 5/1982 | Moore et al. | 126/427 |
| 4,350,144 | 9/1982 | Beckwith | 126/427 |

Primary Examiner—Carroll B. Dority, Jr.
Attorney, Agent, or Firm—Dowrey & Cross

[57] ABSTRACT

A heat exchange system operates on solar energy, supplemented by nonsolar manufactured fuels such as electricity, natural gas, propane and the like. The system includes a solar heat collector and a heat exchanger for delivering the collected solar heat to a water heater and furnace. Supplemental heating means utilizing a nonsolar fuel will heat the collector if an insufficient amount of solar heat is available. The system can also include an air conditioning system.

8 Claims, 14 Drawing Figures 4,535,754

MANUFACTURED FUEL ASSISTED SOLAR HEAT EXCHANGER

BACKGROUND OF THE INVENTION

This application is a continuation-in-part of abandoned application Ser. No. 236,691, filed Feb. 23, 1981.

This invention relates to the field of heat exchange devices for water or space heating, and more particularly to the field of solar energy heat exchange devices.

With rising fuel costs, achieving efficiency in water and space heating by the utilization of freely available energy such as that contained in solar radiation is crucial in both domestic and commercial settings. Unfortunately, prior art solar heating devices have serious shortcomings which have prevented the commercial success and widespread use of these devices. Many prior art devices are not cost-effective, or do not result in sufficient monetary savings to justify the investment and effort involved in their installation. Some require expensive adaptations to existing structures and heating systems. Most are of no use when the sun does not shine, and hence are impractical in areas frequently subject to overcast and cloudy weather. Some solar energy heat exchange systems are inherently limited in their heat supplying capacities and thus are not useful in heating large homes. And many take up considerable amounts of space, making them unsuitable for use in small homes.

An ideal solar heating system would utilize non-manufactured and freely available energy sources such as solar energy, and would do so efficiently and cost-effectively. An ideal system would be compact and easily installed, with little modification of preexisting structures being necessary. This system would be compatible with existing space and water heating equipment, and would be adaptable for other uses, such as air conditioning, pool and hot tub heating, etc. It would also include a means of operation when solar energy is unavailable.

SUMMARY OF THE INVENTION

The present invention is a heat exchange system which operates on solar energy, supplemented by non-solar manufactured fuels such as electricity, natural gas, propane and the like. The system includes a solar heat collector and a heat exchanger for delivering the collected solar heat to water for domestic use or air to be conducted through a forced air heating system, or other heat receiving means. Supplemental heating means utilizing a nonsolar fuel will, when necessary, heat the collector in response to means such as a temperature sensor which detects if an insufficient amount of solar heat has been collected. The system also includes a control for regulating delivery of heat by the heat exchanger.

The present invention is highly efficient, with the preferred embodiment taking the fullest possible advantage of all available energy sources. In the present invention, solar heat is absorbed by a fluid held in coiled tubing of heat conductive material. A solar reflector positioned within the coils provides maximum reflection of sunlight onto the coils. The reflector is formed in a generally frusto-conical shape, having a large number of concave facets to provide the fullest possible reflection of sunlight onto the coils. Furthermore, because the reflector is disposed within the coils, maximum insolation of the coils is achieved in a compact design, which fits within a generally cylindrical closed transparent housing to prevent escape of heat to the environment.

The invention is easily installed and fully compatible with preexisting domestic heating systems. The invention replaces the heat-producing elements of space and water heater systems, and utilizes existing furnaces, fans, ductwork, hot water tanks and the like, with little modification of the same.

The solar heat collecting apparatus of the preferred embodiment can be mounted on the ground or atop a pole or structure or in any other convenient position where it will be subject to insolation. The appearance of a home or other building need not be changed to accommodate the device.

DETAILED DESCRIPTION OF THE DRAWINGS

Figure 1:
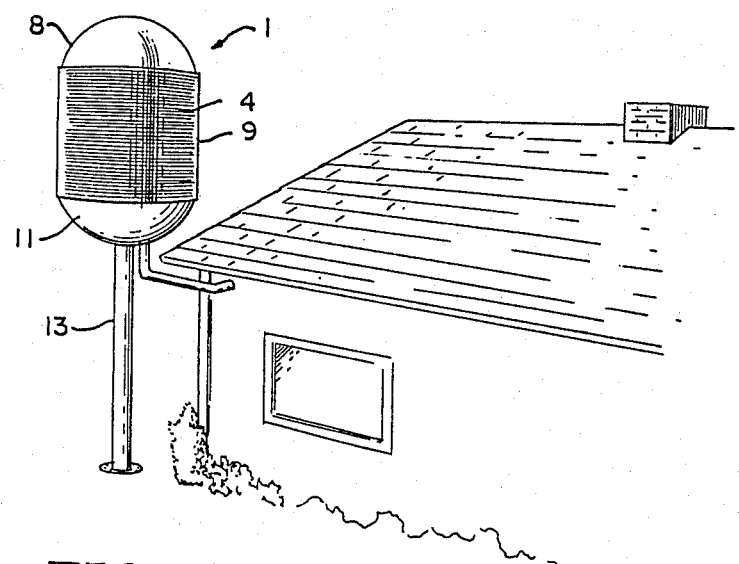
FIG. 1 is a perspective view of the invention installed for domestic water and space heating.

Referring first to FIGS. 1-5, a preferred embodiment of the solar heat exchanger 1 of the present invention includes a heat collection zone 2 in which heat from the sun and, under certain below-described circumstances, from supplemental heat sources, is accumulated in a fluid contained within a helical arrangement of copper tubing, or other heat conductive tubing, forming cylindrical coils 4 which, in normal use, will be positioned on a vertical axis. Positioned within the coils 4 of the preferred embodiment is a reflector 6 which can be constructed of any suitably reflective material, such as stainless steel or that sold under the trademark MYLAR. The reflector 6 preferably is formed of a series of approximately 32 concave facets arranged in a generally frusto-conical configuration coaxial with the coils 4 and having its wider end as its base. While flat facets or a cylindrical frusto-conical shape can, of course, be utilized in the invention, it is preferable to form the reflector 6 from one or more flat sheets of reflective material which are overbent to form slightly concave surfaces, allowing the reflector 6 to approximate parabolic reflection. This results in maximum reflection of solar energy from the reflector 6 onto the coils 4.

Positioned within the reflector 6 is a cylindrical tank 7, coaxial with the coils 4 and reflector 6. As will be explained more fully below, the tank 7 receives fluid from the coils 4, and functions both as a reservoir to hold this fluid, and also as a boiler in which the fluid can be heated by nonsolar means. The coils 4, reflector 6 and tank 7 are enclosed in a transparent housing formed by an upper dome 8, a cylinder 9, and a lower dome 11 of a plastic or other suitable material. Single-walled construction of the housing is preferred for greater economy, although double-walled construction can be used, if desired, for purposes of greater heat insulation. The dome 8 and cylinder 9 can be half-silvered on their interior surfaces to provide greater reflection of sunlight onto the coils 4. A plate 12 supports the coils 4, reflector 6, tank 7 and related elements within the housing.

The entire heat collection zone 2 can be mounted above ground on a pole 13, as shown in FIG. 1, or in any other convenient position where sunlight is available, as, for example, on the ground, the roof of a structure, etc. This is highly advantageous for the homeowner who may choose the position of the device in accordance with aesthetic concerns. Also, the option of pole mounting allows the device to be used in areas where shade from other structures or trees or the like would not allow the use of roof-mounted or other conventional solar heat collector designs. The device is compact, the heat collection zone 2 standing approximately five feet tall, and three feet in diameter.

Returning to the preferred embodiment of the heat collection zone 2 in greater detail, for greatest efficiency, the copper tubing preferably forms four separate, vertically adjacent and interwound coils 4 which are supported on four standards 14 equally spaced around the circumference of the coils 4. The coils 4 can have their turns individually wired to the standards 14, or, alternatively, the standards 14 can be formed with projections to hold the turns of the coils 4. Each of the four coils 4 is coupled to an upper manifold 16 which is in fluid communication with the upper portion of the tank 7, and a lower manifold 17 in fluid communication with the lower portion of the tank 7. A pump 18 of a common and commercially available design is mounted in the lower dome 11 under plate 12 and circulates heat absorbing fluid from the bottom of tank 7 through the lower manifold 17, around the coils 4 to the upper manifold 16, and into the top of the tank 7. While the fluid is circulated through the coils 4 in this manner, it absorbs heat from impinging solar radiation passing through the dome 8 and cylinder 9, and reflecting off the reflector 6 and interior surfaces of the dome 8 and cylinder 9.

Figure 8:
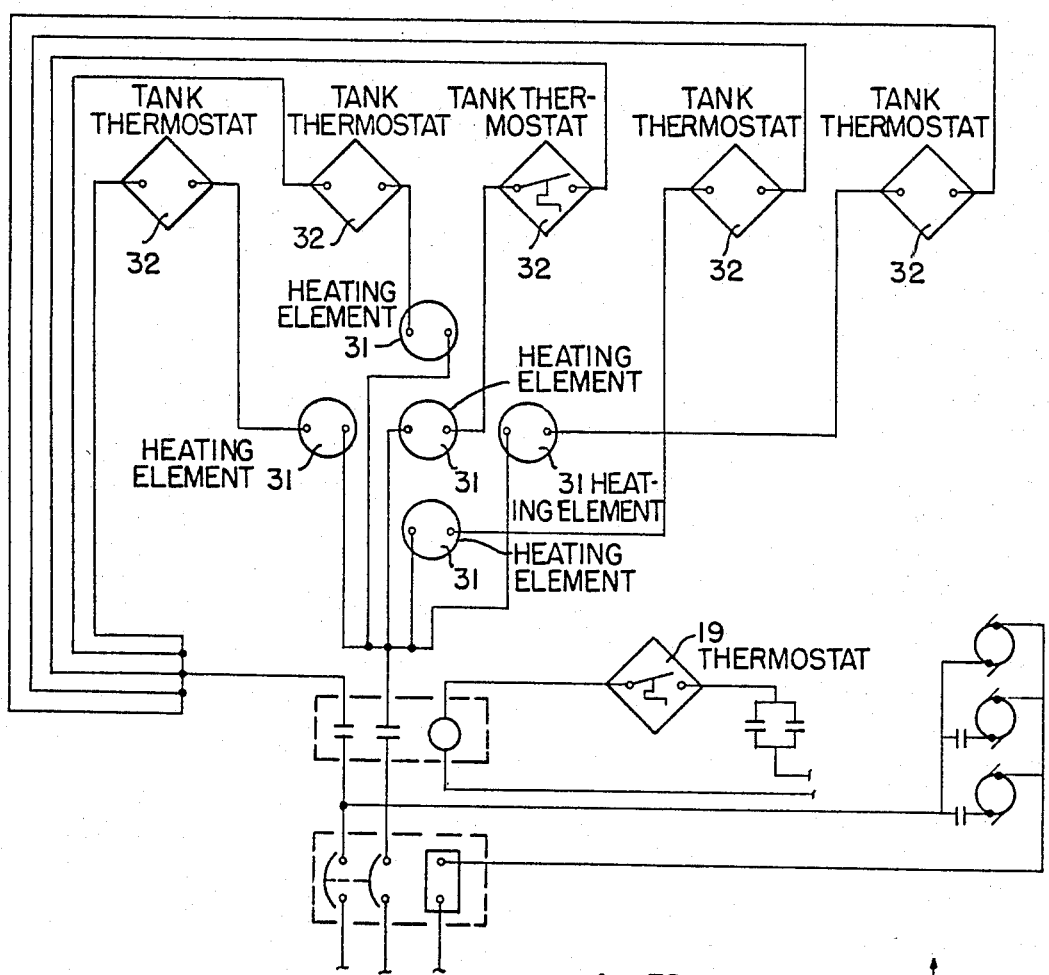
FIG. 8 is a schematic diagram of the temperature sensing and electrical control system for the supplemental heating system of the FIG. 3 embodiment.

The pump 18 is controlled by a thermostat 19, shown in FIG. 8, which detects the temperature of fluid leaving the bottom of the tank 7, and switches off the pump 18 if fluid temperature is not at least 145° F., causing the fluid to remain stationary in the coils 4 and tank 7 until a greater amount of heat is absorbed.

Figure 2:
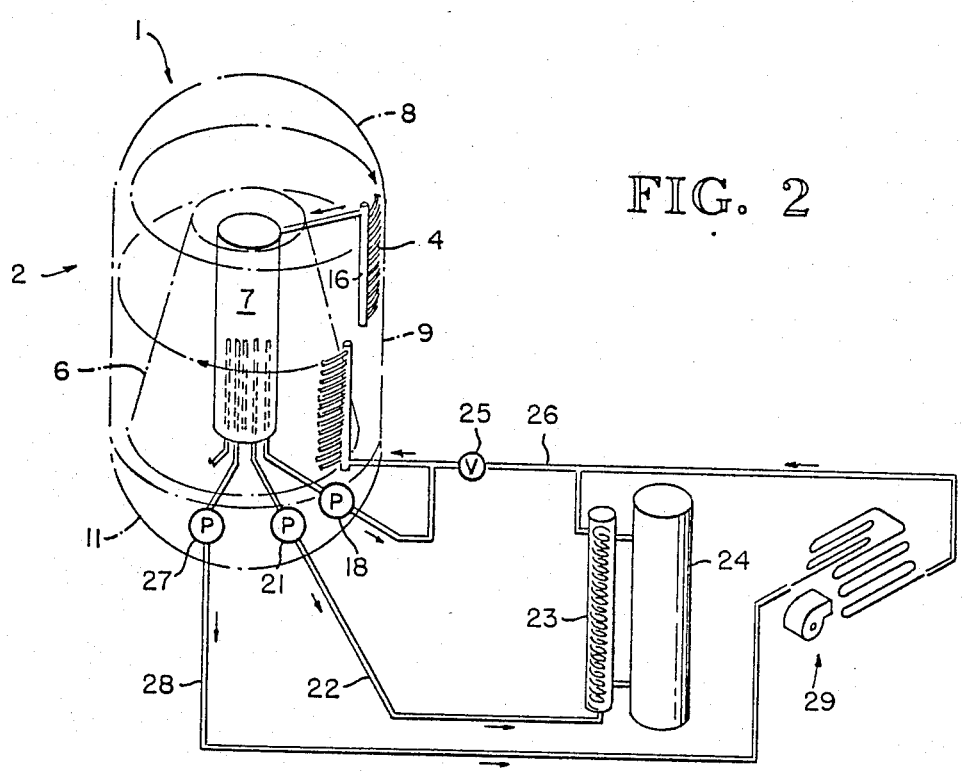
FIG. 2 is a schematic diagram of the invention, showing its connection with a water heater and furnace.

Referring now to FIG. 2, a conventional pump 21 circulates the heat-containing fluid from an outlet line 22 leading from the bottom of the tank 7 to a heat exchanger 23 cooperating with a conventional hot water tank 24, in which heat is transferred from the fluid to water in the preexisting hot water system. The water is heated by fluid in the heat exchanger 23 while the hot water tank 24 acts as a storage tank. After circulating through the heat exchanger 23, the fluid flows through return line 26 and valve 25 therein back to the lower manifold 17 in the heat collection zone 2 to be recirculated and reheated.

A second pump 27 circulates heated fluid from the tank 7 through a second outlet line 28 in parallel with the first outlet line 22, to a conventional and preexisting space heating system 29. The present invention is adaptable for use with both forced air and hot water heating systems. In a forced air system, a heat exchanger transfers heat from the fluid to air which is forced through a plenum by conventional fan means such as that already in the heating system. In a hot water system, the boiler is bypassed, and the fluid is used in place of water to flow through the piping of the heating system. In either case, the existing thermostat will remain as a control for the heating system. After circulating through the heating system or heat exchanger, the fluid flows back to the heat collection zone 2 through return line 26 and valve 25. It will be understood, of course, that the present invention can be adapted for use with other types of space heating systems or to fit special structural requirements, in manners which will be obvious to those skilled in the art.

The solar heat exchanger of the present invention includes nonsolar supplemental heating means which enables the invention to perform even during overcast weather when insolation of the coils is insufficient to heat the fluid therein to the desired degree. In a preferred embodiment, these supplemental heating means will utilize either electricity, natural gas or propane as an energy source, although any desired supplemental energy source can be used, with suitable modifications to the system. Referring first to the preferred electrical embodiment shown in FIGS. 3 and 4, four supplemental heat sources such as electrical resistance heating elements 31 are arranged around the periphery of the tank 7, with a fifth heating element 31 at the center of the tank. Referring to FIG. 8, each of the five resistance heating elements 31 in a preferred electrical embodiment is individually controlled by a separate thermostat 32 within the tank 7, which will sense the temperature of the fluid in the tank 7 and switch on its associated heating element 31 when fluid temperature drops to a preset limit. Preferably, the preset limits are 165° F., 155° F., 145° F., 140° F., and 130° F. Thus, when fluid temperature drops below 165° F., a first heating element 31 is switched on; when temperature drops to 155° F., a second heating element 31 is switched on, in addition to the first, etc. This stepwise activation of the heating elements 31 allows efficient use of minimal amounts of electricity for continuous operation of the device through periods of unfavorable weather.

As an alternative to electrical heat, other manufactured fuel sources such as natural gas or propane can be used in the invention to supplement the solar heating of the fluid. Preferred embodiments utilizing such alternative fuel sources will be identical to the above-described embodiment, except for the supplemental heating system. Referring to FIGS. 10–13, in a preferred embodiment using a gas as supplemental fuel, the fuel will be burned through sixteen boiler tubes 33 arranged in concentric circles within the tank 7. A preset thermostat connected to a modulating gas valve 36 controls the amount of gas delivered from a conventional pressurized gas source to a gas jet 40 at the base of each boiler tube 33 through an inlet line 37 coupled to a conduit 38, with air being supplied by conventional means such as a fan 39.

Figure 3:
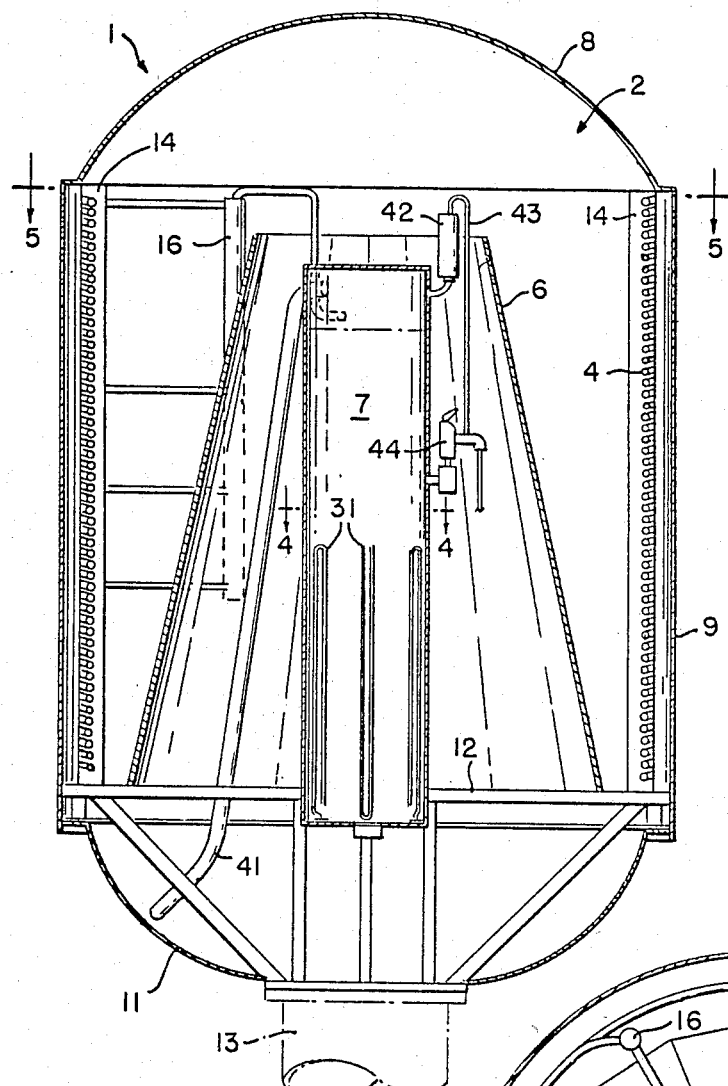
FIG. 3 is a cross-section of the heat collection zone of an embodiment of the invention using an electrical supplemental heat source, taken along line 3—3 of FIG. 5.
Figure 4:
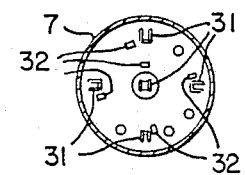
FIG. 4 is a cross-section of the tank of the embodiment of FIG. 3, taken along line 4—4 of FIG. 3.
Figure 5:
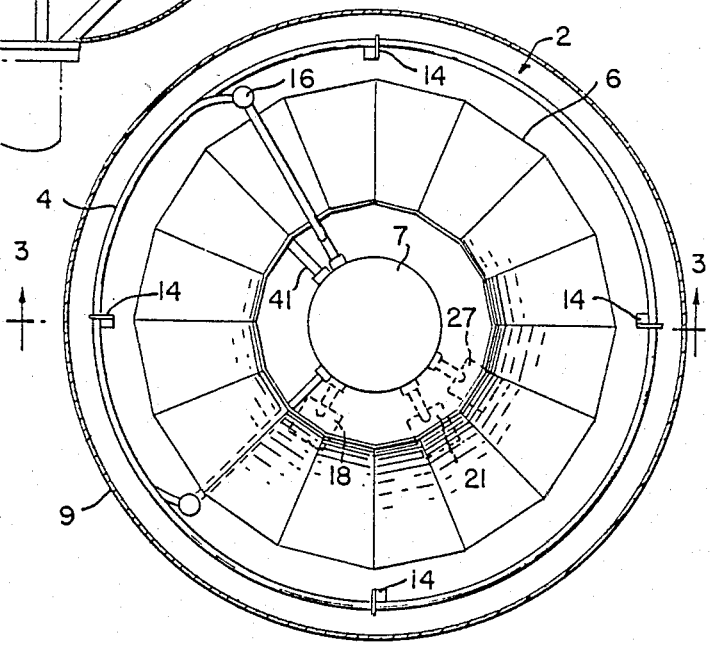
FIG. 5 is a cross-section of the heat collection zone of the invention, taken along line 5—5 of FIG. 3.

Referring to FIG. 3, in a system using either an electric, gas, or other supplemental heat source, a pressure release mechanism including an exhaust outlet 41, air check valve 42, bleeder line 43, and pop-off valve 44 is provided on the tank 7 to ensure safe operation of the device.

Figure 6:
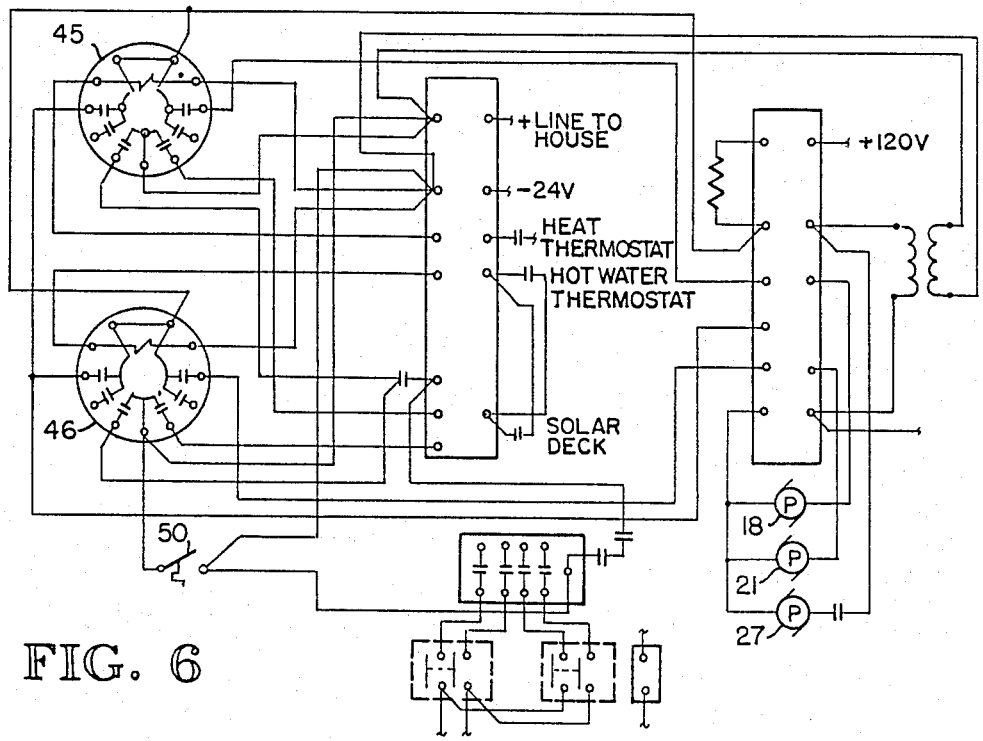
FIG. 6 is a diagram of the electrical system of the embodiment of FIG. 3.
Figure 13:
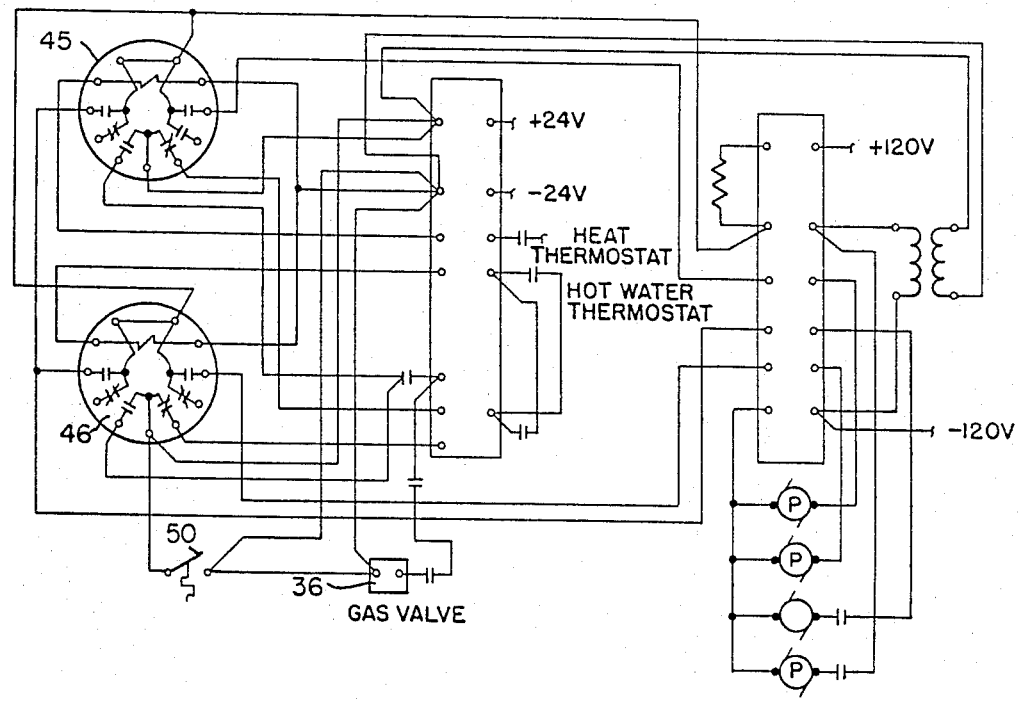
FIG. 13 is a diagram of the electrical system of the embodiment of FIG. 10.

Referring to FIGS. 6 and 13, in the electrical control systems for preferred embodiments using either gas or electric supplemental heat sources, relays 45 and 46 control pumps 21 and 27 circulating fluid to the hot water heater and furnace, respectively. A thermostat 50 located within the heat collection zone 2 and preferably mounted near the plate 12, senses the air temperature therewithin and prevents circulation of fluid to the furnace heat exchanger 23 and hot water tank 24 if air temperature is not at least 110° F. This is advantageous during periods of heavy supplemental fuel use, such as winter, since the fluid will be circulated through the heat collection zone 2 for a greater period of time, to collect more solar and supplemental heat before being transferred to the space and water heating systems.

If desired, the solar heat exchanger 1 of the present invention can be adapted for cooling, as well as heating. In a preferred embodiment incorporating a cooling system, the lower dome 11 holds an adaptation of a conventional and commonly known absorption refrigeration system 51, shown schematically in FIGS. 7 and 14. In this refrigeration system, a pump 52 circulates the fluid from the tank 7 through a diversion valve 53 which can direct the fluid either to the furnace heat exchanger or to the refrigeration system 51, as desired. When air conditioning is desired, the diversion valve 53 is set by any conventional and well known means to allow the fluid to flow through an evaporation-absorption unit 54, in which a refrigerant substance, preferably water, is sprayed by an evaporator 58 onto a tube bundle 59 containing water which will be chilled by the evaporation process, along with the fluid from the tank 7, for a refrigerative effect. The now chilled fluid, which is preferably the above-described antifreeze mixture, which is lighter than water, passes out of the evaporation-absorption unit 54 through outlet line 56 leading to the furnace heat exchanger, which will now act in a cooling capacity for air conditioning purposes. It has been found that the fluid can be chilled to approximately 50° F. by this process.

As is commonly done in absorption refrigeration systems, to maintain the desired pressure within the evaporation-absorption unit 54, an absorbant fluid which has a high affinity for the refrigerant vapor, such as Freon R-11, or a lithium bromide solution, is sprayed upward within the evaporation-absorption unit 54 by the absorber 61. As the solution falls from the spray, it sinks through the lighterweight fluid from the solar heat exchanger 1, and flows down a gravity feed tube 62 to a generator 63 containing a second tube bundle 64 which contains hot water, causing refrigerant vapor to boil off the solution. The now strengthened absorbant solution is then pumped through outlet 66 by pump 57 back to the absorber 61 to be resprayed.

Figure 7:
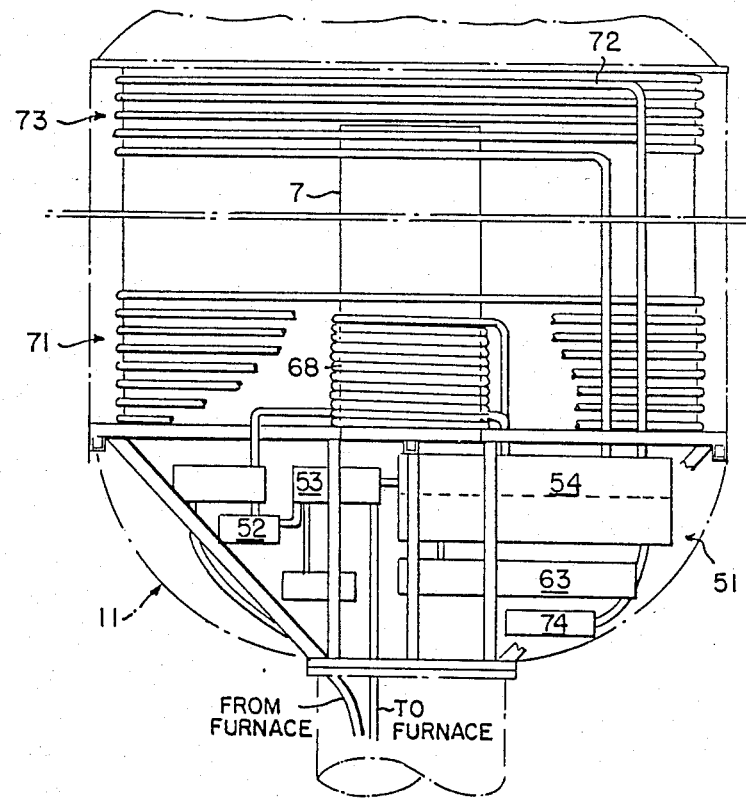
FIG. 7 is a schematic diagram of an embodiment of the invention adapted for air conditioning purposes.
Figure 9:
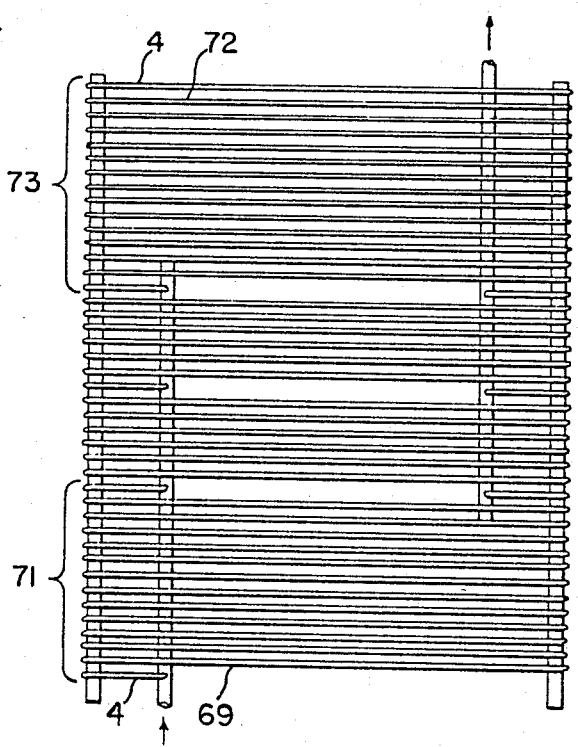
FIG. 9 is a detail of the heat collection tubing of the embodiment of FIG. 7.
Figure 10:
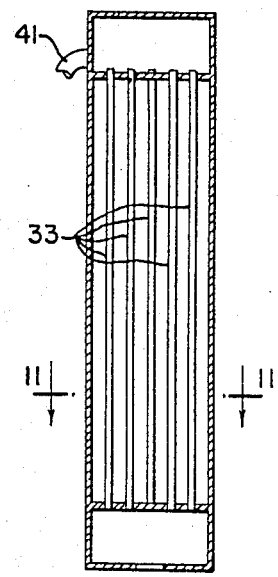
FIG. 10 is a sectional view of an embodiment of the invention using a natural gas or propane supplemental fuel source.
Figure 11:
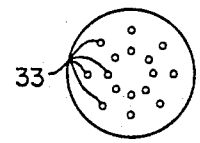
FIG. 11 is a cross-section of the tank of the embodiment of FIG. 10 taken along line 11—11 of FIG. 11.
Figure 12:
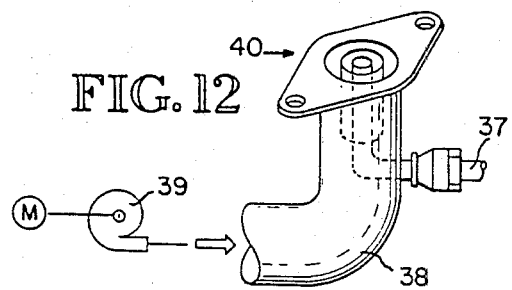
FIG. 12 is a detail of the gas jet of the gas fueled embodiment of FIG. 10.

The hot refrigerant vapor which has boiled off circulates from the generator through the vapor outlet line 67 to a first coil 68 adjacent the base of tank 7, shown in FIG. 7, and a second coil 69, shown in FIG. 9, surrounding the reflector 6 and preferably having its seven turns immediately adjacent and alternating with the lowest seven turns of the heat collecting coil 4, forming a first coil section 71. The vapor will condense within these coils and release heat to the tank 7 and coil 4, adding to the efficiency of the solar heat exchanger 1. Then, the refrigerant will flow back into the generator 63.

Figure 14:
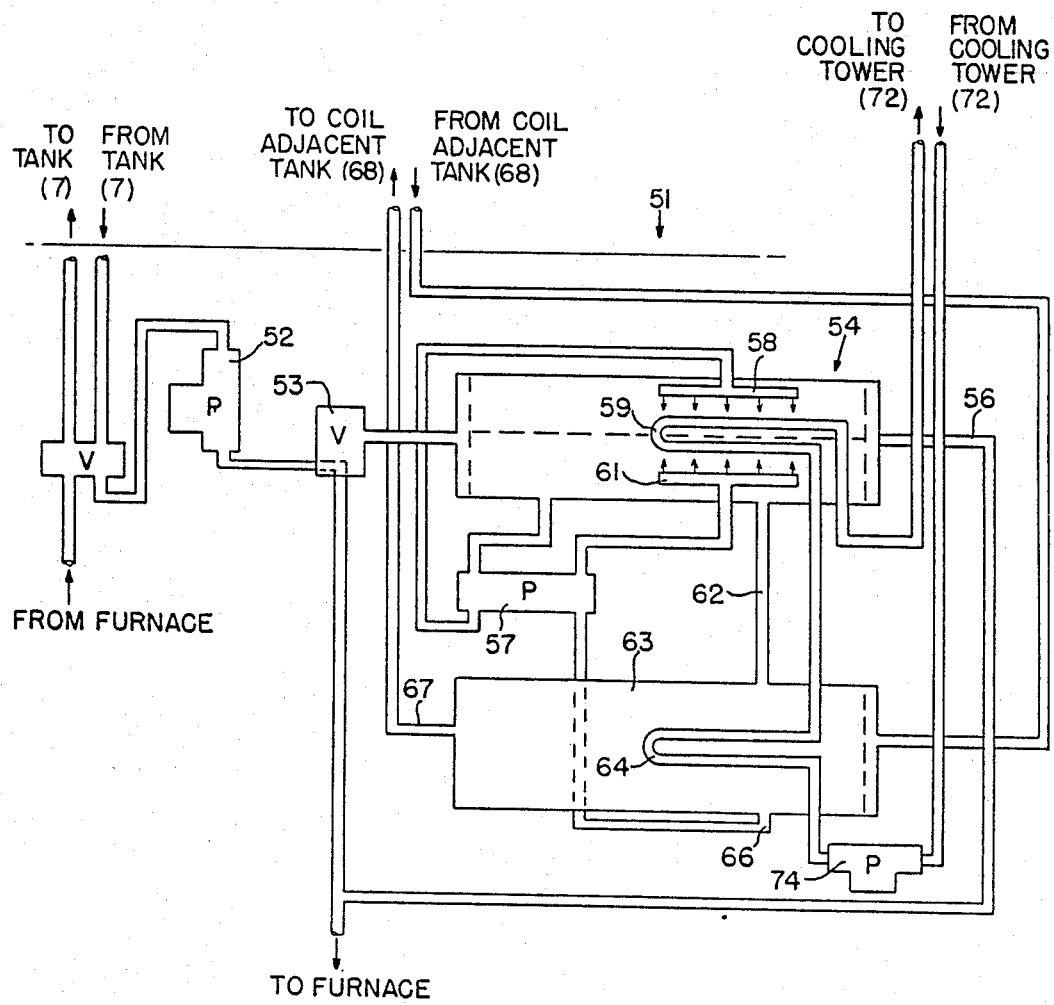
FIG. 14 is a schematic flow diagram of the refrigeration system of the FIG. 7 embodiment.

The pair of tube bundles 59 and 64 which are shown in FIG. 14 form part of a closed circulating system, which includes a cooling tower coil 72 which, as shown in FIG. 9, preferably has its seven turns adjacent and alternating with the uppermost turns of the heat collecting coils 4 in a second coil section 73, separated from the first section 71 by approximately fourteen turns of the coils 4. The water within this system will absorb heat while passing through the heat collection zone 2, and then be circulated by a pump 74 through the tube bundle 64 within the generator 63, where it will give up the absorbed heat to boil off refrigerant vapor from the solution therein. From there, it is circulated up to the tube bundle 59 within the evaporation-absorption unit 54 to be further cooled by the evaporation process, after which it can be circulated to any desired conventional and well known heat exchange unit for air conditioning or other refrigeration purposes. Finally, the water continues back to the cooling tower coil 72.

Although the invention has been described with reference to preferred embodiments used in specific environments, it will be understood that modifications or adaptations of the system to other uses will be within the scope of the invention.

What is claimed is:

1. A solar energy collector system comprising
means for absorbing solar energy, including a cylindrical coil for containing a heat absorbing fluid;
means for reflecting solar radiation onto said coil, including a plurality of reflective surfaces connected in a frustro-conical configuration within and substantially coaxial with said coil, and;
a housing enclosing said coil, said housing having an exterior surface which is transparent to solar radiation, and an interior surface which is reflective of solar radiation.

2. The system of claim 1 wherein said reflecting means is substantially equal in height to said coil.

3. The system of claim 2 wherein said housing further comprises a plate and a plurality of standards extending therefrom for supporting said coil.

4. The system of claim 3 wherein said housing includes a cylindrical sidewall substantially equal in height to said coil, and a dome overlying said coil and said reflecting means.

5. A non-solar fuel supplemented solar heat exchange system comprising:
means for collecting solar heat, including a cylindrical coil and a heat absorbing fluid contained in said coil,
means for reflecting solar radiation onto said coil, including a plurality of reflective surfaces joined into a frustro-conical configuration within and substantially coaxial with said coil, means for detecting the collection of a predetermined amount of solar heat by said collecting means, means of heating said collecting means with a non-solar heat source in response to said detecting means, means for delivering heat from said collecting means to a heat receiving means, means responsive to said detecting means for controlling delivery of said heat by said heat delivery means and a housing enclosing said coil and said reflecting means, said housing having an exterior surface which is transparent to solar radiation, and an interior surface which is reflective of solar radiation.

6. The system of claim 5 wherein said reflecting means is substantially equal in height to said coil.

7. The system of claim 6 wherein said housing further comprises a plate and a plurality of standards extending therefrom for supporting said coil.

8. The system of claim 7 wherein said housing includes a cylindrical sidewall substantially equal in height to said coil, and a dome overlying said coil and said reflecting means.

* * * * *